Figure 1:
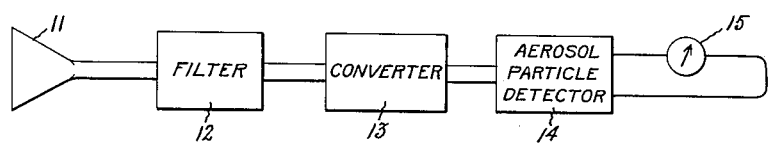

Aug. 3, 1965    T. A. RICH    3,198,721
PROCESS AND APPARATUS FOR DETECTING GAS
Original Filed Jan. 3, 1955

Inventor:
Theodore A. Rich,
by Charles W Helzer
His Attorney.

United States Patent Office 3,198,721
Patented Aug. 3, 1965

3,198,721
PROCESS AND APPARATUS FOR
DETECTING GAS
Theodore A. Rich, Scotia, N.Y., assignor to General
Electric Company, a corporation of New York
Continuation of application Ser. No. 479,322, Jan. 3,
1955. This application Mar. 11, 1960, Ser. No. 15,028
7 Claims. (Cl. 204—157)

This application is a continuation of my copending application Serial No. 479,322, filed January 3, 1955, assigned to the assignee of the present invention, and now abandoned.

This invention relates to a gas detecting instrument.

More particularly, the invention relates to an instrument of the type for detecting extremely minute quantities of a foreign gas in a mixture which is suitable for use in sensing a tracer gas introduced into a pressure or vacuum system for leak detection purposes, or for measuring the combustion efficiency of internal combustion engines.

In many normal processes carried out in every day living, extremely minute quantities of gases are given off which may be noxious, and hence harmful to life. For example, the mere transfer of gasoline from a filling station pump to an automobile, produces a quantity of sulphur dioxide. Other, more highly noxious gases may be given off in other familiar processes, of which we are unaware since the quantities of the foreign gas in all of these examples is extremely minute. It has not been possible to detect such minute quantities of foreign gases heretofore because there were no instruments available which were sufficiently sensitive to do this job.

Also the problem of detection of leaks in pressure or vacuum systems that comprise parts of industrial processing equipment has been a source of considerable concern. While there are many detecting devices available, most of these fall into the category of not being sufficiently sensitive to detect extremely fine leaks, while those which are sensitive enough to do the job, are comparatively expensive to manufacture. Additionally, there is a need for an instrument that is capable of obtaining quick and relatively accurate indications of the combustion efficiency of the internal combustion engines.

It is, therefore, one object of the present invention to provide a new and improved gas detecting instrument which is highly sensitive, and is capable of detecting extremely minute quantities of a foreign gas in a mixture. Still another object of the invention is to provide a gas detecting instrument of the above type which is capable of use as a leak detector or as a combustion efficiency measuring device.

A further object of the invention is to provide a gas detecting instrument having the above characteristics which is constructed of readily available components, is simple in design, and relatively inexpensive to manufacture.

Figure 2:
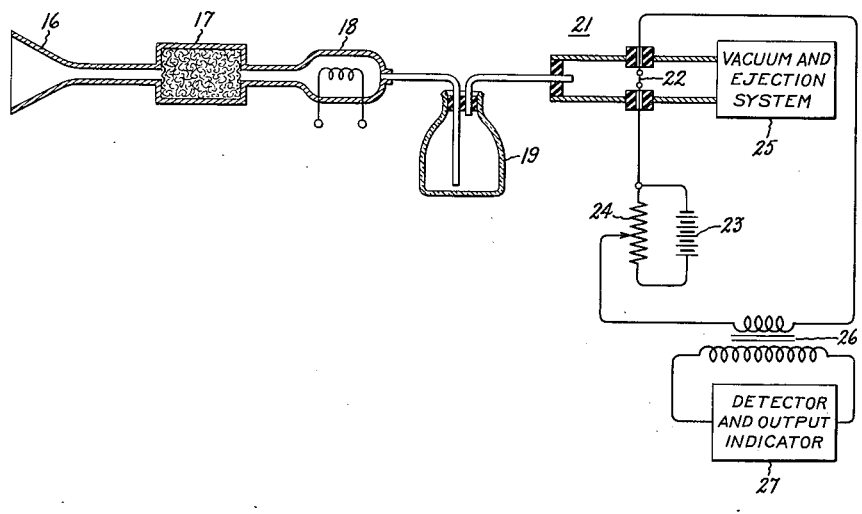

Other objects, features, and many of the attendant advantages of this invention will be appreciated more readily as the same becomes better understood by reference to the following detailed description, when considered in connection with the accompanying drawings, wherein like parts are identified by the same reference character, and wherein:

FIG. 1 is a schematic block diagram of a gas detecting instrument constructed in accordance with the invention; and FIG. 2 is a functional schematic diagram of a practical instrument incorporating the features of the present invention.

The gas detecting unit illustrated schematically in FIG. 1 of the drawings includes an intake element 11, such as a scoop, for obtaining a suitable sample of the atmosphere to be monitored. The intake element 11 has an outlet conduit connecting the same to the intake side of a filter unit 12 which may comprise a housing containing glass wool, or other suitable filtering element for removing any particles that might be contained in the gaseous sample obtained through intake element 11. The outlet side of filter unit 12 is connected through a suitable outlet conduit to the input side of a converter 13. The converter 13 may constitute a hot platinum wire, a source of ultraviolet light, a spark gap, or some other suitable element for converting the gaseous component to be detected into an aerosol particle forming substance. The converter 13 could also comprise a chamber for mixing the first gas to be monitored with a second gas which reacts chemically with the first gas to produce an aerosol particle forming substance. This aerosol forming substance is then supplied through a suitable outlet conduit to the inlet side of an aerosol particle detector 14 having a suitable electrical indicating instrument 15 connected thereto for providing an indication of the quantity of gaseous substance being monitored.

Aerosol particle detector 14 preferably comprises instrument similar to that disclosed in U.S. Patent No. 2,684,008, B. Vonnegut, "Method and Apparatus for Measuring the Concentration of Condensation Nuclei," issued July 20, 1954, but may also comprise an instrument such as that disclosed in U.S. patent application 431,706, T. A. Rich, "Method and Apparatus for Measuring Condensation Nuclei," now U.S. Patent No. 2,791,901. For a more detailed description of the construction and operation of any one of the these instruments, reference is made to the disclosures in each one of the applications, or patent, whichever the case might be. However, briefly, the aerosol particle detector serves to provide a count of the individual aerosol particles occurring in a particular medium being monitored by the instrument. In the case of the processing monitoring instrument disclosed in U.S. Patent No. 2,684,008, the gaseous medium being monitored for aerosol particles is first humidified by passing the medium through a suitable humidifier, and then supplied to an expansible chamber. In the chamber, the humidified gaseous medium is suddenly expanded causing the moisture in the medium to condense about individual aerosol particles formed therein as condensation nuclei centers. By this action a number of individual water drops are formed, which under suitable illumination scatter sufficient light to be measured by a photocell. The electric output signal produced by the photocell unit then provides an indication of the number of water droplets formed by the individual aerosol particles, and, hence, the number of aerosol particles contained in the medium being monitored.

In operation, the medium to be monitored is to be taken in by the intake element or air scoop 11 and passed to the filter unit 12 and supplied to the converter unit 13. The converter unit 13, which might be a hot platinum wire, a source of ultraviolet light, or a spark gap, then converts the sample of gas to be detected into an aerosol forming substance. For example, if the gas to be detected is sulfur dioxide ($SO_2$), the converter unit 13, which can be any one of the converters identified above, acts to convert the gas to $SO_3$ by reaction of the sulfur-dioxide ($SO_2$) with the oxygen ($O_2$) contained in the air supplied through the air scoop 11. This converted gas ($SO_3$) is then supplied to the aerosol particle detector 14 which includes a humidifier. Upon passing $SO_3$ through a humidifier, the $SO_3$ is converted to sulfuric acid ($H_2SO_4$) which then forms aggregates (or particles). The particles thus formed, are then supplied to an expansion chamber where they are submitted to an expanding process that causes water droplets to form about the particles as centers. By irradiating these water droplets, and obtaining an electrical indication of the intensity of the scattered irradiation, an effective measurement of the total amount of $SO_2$ contained in the medium being monitored can be obtained.

In addition to $SO_2$, the gas detection unit operates on certain other gases, for example $H_2S$ (hydrogen sulphide), in the same manner to provide an output indication of the quantity of such gases in any particular medium. For this reason, it can be appreciated that the instrument can be used as a leak detector device for sensing out a tracer gas (such as $SO_2$) which has been introduced into a vacuum or pressure system for the purpose of finding small leaks. In addition, the instrument can be useful in determining the amount of unburned gases contained in the exhaust of internal combustion engines, thus providing an indication of the combustion efficiency of the engine.

A second form of the invention is illustrated in FIG. 2 of the drawings, and includes an intake element 16 that is connected through a suitable outlet conduit to a filter unit 17. The filter unit 17 may comprise glass wool contained within a housing, or other suitable filtering device for removing foreign particles suspended in the sample supplied through the intake element 16. The outlet from the filter unit 17 is connected through a connecting conduit to a converter unit 18 that may comprise a hot platinum wire, a source of ultraviolet light, a spark gap, corona points or other suitable device for converting the particular constituent gas to be detected into an aerosol particle forming substance. The converted substance is then supplied to a humidifier 19. The humidifier 19 operates to convert the substance supplied thereto from the converter unit 18 into a gaseous substance containing aerosol particles that are then supplied through an outlet conduit to a detector unit indicated generally at 21.

For a detailed description of the construction and operation of the detector unit 21 reference is made to U.S. patent application, S.N. 217,803, Vonnegut, "Means for Measuring Individual Aerosol Particles," filed March 27, 1951, now U.S. Patent No. 2,702,471. Briefly, however, the detector includes a fine collector element 22 that is disposed in the path of the atmosphere to be monitored so that aerosol particles contained therein impinge upon the element. The element is insulatingly supported within a housing to which the outlet conduit from humidifier 19 is connected, and is electrically connected through suitable conductors to a source of direct current electric energy 23. The source of electric energy 23 may have rheostat element 24 connected in parallel circuit relationship therewith for controlling the amount of electric currents supplied to the collector element 22. The housing in which the collector element 22 is supported, is connected to a suitable vacuum and ejection system 25 for causing the flow of the substance to be monitored out of humidifier 19, past the collector element where it enters the system 25 which eventually exhausts to the atmosphere. Also connected in electrical circuit relationship with the collector element 22 is the primary winding of a pulse transformer 26 that has the secondary winding thereof connected to a suitable detector and output indicator circuit 27.

The system shown in FIG. 2 operates in the following manner: the sample of the medium to be monitored is taken in through the intake element 16, and supplied to the filter unit 17 which removes any foreign aerosol particles or other larger particles which might be contained therein. The filtered medium is then supplied to the converter unit 18 which acts to convert the gaseous substance to be detected into an aerosol particle forming substance. Here again, for example, if the component gas to be sensed is sulfur dioxide ($SO_2$), the converter unit operates to convert $SO_2$ to $SO_3$ and the converted substance is supplied to the humidifier 19. In the humidifier 19, the gas is converted to sulfuric acid ($H_2SO_4$) vapor which aggregates as aerosol particles that are drawn past the collector element 22 by the vacuum and ejection system 25. These aerosol particles then impinge upon the collector element 22 and produce sharp changes in the temperature thereof. The changes in temperature of element 22 likewise change the resistivity thereof, and results in producing instantaneous changes in electric current flow which are superimposed on the direct current flowing through the element.

The number of the instantaneous electric signal pulses thus produced are, directly related to the number of aerosol particles impinging upon the collector element 22, and, hence, is indicative of the amount of gaseous material, (in this instance, $SO_2$) contained in the material being monitored.

From the foregoing description, it can be appreciated that the invention provides a new and improved gas detecting instrument which is highly sensitive, and is capable of detecting extremely minute quantities of a foreign component in a gaseous mixture. The instrument comprises a new scientific tool with which it is possible to investigate phenomenon heretofore undiscoverable. The instrument is also capable of use as a leak detector, or as an instrument for measuring the combustion efficiency of internal combustion engines. This instrument incorporates all of the above characteristics, yet is constructed of readily available components, is simple in design, and relatively inexpensive to manufacture.

Obviously, other modifications and variations of the invention are possible in the light of the above teachings. It is, therefore, to be understood, that changes may be made herein which are within the full intended scope of the invention as defined by the appended claims.

What I claim as new and desire to secure by Letters Patent of the United States is:

1. The method of detecting a first gas by reaction with a second gas which comprises removing ambient aerosol particles entrained in both gases, converting the treated first gas into an aerosol particle forming substance by reaction with the second gas, and detecting the aerosol particles formed by the reaction process.

2. A gas detecting instrument including in combination a filter for filtering a portion of the atmosphere to be tested for a gaseous component, a converter connected to the filter for converting the filtered gaseous component into an aerosol particle forming substance, said converter comprising an electric corona discharge device, a humidifier connected to the outlet from said converter, a conductive temperature sensitive element to be maintained at a temperature at least as high as the vaporization temperature of said aerosol particles, a support for mounting said element in the path of projection of the particles, a source of direct current electric energy connected in circuit relationship with said element to heat the same, and current pulse responsive means in circuit relationship with said element for detecting the charge in current through said element occasioned by the vaporization thereupon of individual aerosol particles.

3. A gas detecting instrument including in combination an intake scoop for obtaining a sample of the atmosphere to be monitored, a filter unit connected to the outlet from said scoop for filtering the sample obtained, an ultraviolet light converter connected to the outlet from said filtering unit, means for introducing a filtered amount of a second gas into the ultraviolet light converter that reacts with the filtered sample for converting the filtered sample into an aerosol particle forming substance, a humidifier connected to the outlet from said converter for humidifying the aerosol particle forming substance, means for controlling the condensation conditions of said last mentioned substance for condensing water vapor about the converted aerosol particles as centers to form clouds of droplets, said condensation condition controlling means being connected to the outlet from said humidifier, a source of radiation for irradiating the cloud of droplets, radiation sensitive photoelectric means in the path of the radiation scattered by the clouds of droplets for developing a varying electric signal indicative of the concentration of aerosol particles and hence the quantity of gas being monitored, and indicator means electrically coupled to said radiation sensitive means for indicating the magnitude of the varying electric signal.

4. A gas detecting instrument including in combination an intake scoop for obtaining a sample of the atmosphere to be monitored, a filtered unit connected to the outlet from said scoop for filtering the sample obtained, an electric corona discharge converter connected to the outlet from said filter unit, means for introducing a filtered amount of a second gas into the electric corona discharge converter that reacts with the filtered sample for converting the filtered sample into an aerosol particle forming substance, a humidifier connected to the outlet from said converter for humidifying the aerosol particle forming substance, means for controlling the condensation conditions of said last mentioned substance for condensing water vapor about the converted aerosol particles as centers to form clouds of droplets, said condensation condition controlling means being connected to the outlet from said humidifier, a source of radiation for irradiating the clouds of droplets, radiation sensitive photoelectric means in the path of the radiation scattered by the clouds of droplets for developing a varying electric signal indicative of the concentration of aerosol particles and hence the quantity of gas being monitored, and indicator means electrically coupled to said radiation sensitive means for indicating the magnitude of the varying electric signal.

5. A gas detecting instrument including in combination a filter for filtering a portion of the atmosphere to be tested for a first gaseous component, an ultraviolet light converter connected to the outlet from the filter, means for introducing a filtered sample of a second gas into the ultraviolet light converter that reacts with the first gaseous component for converting the filtered first gaseous component into an aerosol particle forming substance, and an aerosol particle counter connected to the outlet from said converter.

6. A gas detecting instrument including in combination a filter for filtering a portion of the atmosphere to be tested for a first gaseous component, an electric corona discharge device converter connected to the outlet from the filter, means for introducing a filtered sample of a second gas into the electric corona discharge device converter that reacts with the first gaseous component for converting the filtered first gaseous component into an aerosol particle froming substance, and an aerosol particle counter connected to the outlet from said converter.

7. A gas detecting instrument including in combination a filter for filtering a portion of the atmosphere to be tested for a gaseous component, a converter connected to the filter for converting the filtered gaseous component into an aerosol particle forming substance, said converter comprising an ultraviolet light converter, a humidifier connected to the outlet from said ultraviolet light converter, a conductive temperature sensitive element to be maintained at a temperature at least as high as the vaporization temperature of said aerosol particles, a support for mounting said element in the path of projection of the particles, a source of direct current electric energy connected in circuit arrangement with said element to heat the same, and current pulse responsive means in circuit relationship with the said element for detecting the change in current through said element occasioned by the vaporization thereupon of individual aerosol particles.

References Cited by the Examiner

UNITED STATES PATENTS

| 1,530,202 | 3/25 | Rodke | 23—255 |
| 2,684,008 | 7/54 | Vonnegut | 88—14 |
| 2,684,329 | 7/54 | Rouy | 204—174 |
| 2,702,471 | 2/55 | Vonnegut | 23—255 |
| 2,774,652 | 12/56 | Vonnegut | 23—232 |
| 2,850,640 | 9/58 | Dudley et al. | 204—157 |
| 2,897,059 | 7/59 | Van Luik | 204—164 |

FOREIGN PATENTS

| 665,528 | 1/52 | Great Britain. |
| 666,136 | 2/52 | Great Britain. |

OTHER REFERENCES

Ellis et al.: "The Chemical Action of Ultraviolet Rays, Reinhold Publishing Co., 1941, pages 330–331.

WINSTON A. DOUGLAS, *Primary Examiner.*

JOHN H. MACK, JOHN R. SPECK, *Examiners.*